Patented Aug. 12, 1952

2,606,879

UNITED STATES PATENT OFFICE 2,606,879

ORGANOPOLYSILANES

Harold A. Clark, Midland, Mich., assignor to Dow Corning Corporation, Midland, Mich., a corporation of Michigan No Drawing. Application June 15, 1949, Serial No. 99,337

5 Claims. (Cl. 260—2)

The present invention relates to organopolysilanes and their production and in particular, involves the reaction of organochlorosilanes with sodium to produce organopolysilanes.

Heretofore, Kipping has shown that when diphenyldichlorosilane is reacted with sodium he obtained five products, three of which were crystalline, one a nearly colorless, slightly gelatinous powder and one a glue-like readily soluble mass. Analogous results were obtained by Kipping when he reacted dibenzyldichlorosilane with sodium and ditolyldichlorosilane with sodium.

In accord with the present invention an alkali metal is reacted with a dialkyldichlorosilane in liquid phase having the formula $R_2SiCl_2$, where R is alkyl from methyl to stearyl and at least one R is an alkyl which contains at least two carbon atoms. The products hereof, so produced, are polymers in which the polymer units are of the structure $R_2Si=$ and in which the polymer units are linked by silicon to silicon bonds.

The production of the dialkyldichlorosilanes of the above indicated type has been well known in the art for some time.

Any alkali metal may be effectively utilized though sodium or potassium is preferred due to their commercial availability. The alkali metal is employed in amount at least equivalent to the chlorine present in the chlorosilane reactant. The alkali metal should be in a finely divided state to promote the production of a high yield. To assist in securing fine division a diluent may be used. The alkali metal may be either finely divided, molten alkali metal or finely divided suspended solid alkali metal. If desired the eutectic alloy of sodium and potassium may be employed.

The dialkyldichlorosilane of the above indicated type is contacted with the alkali metal. This may be accomplished by adding the chlorosilane to the finely divided alkali metal suspended in a solvent boiling above the melting point of the alkali metal at the operating pressure, such as toluene or xylene. Another specific mode of employment of the present invention is to add the alkali metal as wire, small pieces or as finely divided, suspended, alkali metal to the chlorosilane. The reaction hereof is exothermic.

After the reaction has occurred, the product may be separated from by-products as by filtering and washing to remove any alkali metal and alkali metal chloride.

The reaction product upon stripping yields the polysilane product in high per cent yield. The product varies from a grease-like material in the case of a diethylpolysilane to a wax-like material in the case of methyl stearylpolysilane.

The products of the present invention are miscible in all proportions with warm toluene or xylene. The products of the present invention are only very slightly soluble in the lower alcohols and ketones.

The products of the present invention have utility for stop cock greases, for lubricants, for car polishes, and for shoe polishes.

EXAMPLES

Example 1

157 parts of $(C_2H_5)_2SiCl_2$ were added gradually to 50.6 parts of molten metallic sodium in 200 parts of xylene. The reaction was slow in starting. Vigorous stirring was employed. The reaction mixture was refluxed for 16 hours, at the end of which time the test for chlorides was negative. This reaction mixture was then filtered and washed with hot xylene. The product was stripped of xylene and was a high polymer white grease in which the polymer units were $$(C_2H_5)_2Si=$$

Example 2

235.5 parts of $CH_3(C_3H_7)SiCl_2$ were added gradually to 75.9 parts of molten metallic sodium in 515 parts of dry toluene. The reaction proceeded rapidly. The reaction mixture was refluxed for 40 hours, at the end of which time the test for chlorides was negative. This reaction mixture was then filtered and washed. The product was stripped of the toluene. The resulting grease-like product was a polysilane, the polymer units of which were of the formula $CH_3C_3H_7Si=$.

Example 3

156 parts of $(n\text{-}C_4H_9)_2SiCl_2$ were added to 50 parts of molten metallic sodium in 433 parts of dry toluene. The reaction proceeded rapidly. The reaction mixture was refluxed for 5 hours, at the end of which time the test for chlorides was negative. The reaction mixture was next filtered and washed. $NaHCO_3$ was added to the mixture, which was then washed twice with hot water. The product was stripped of the toluene. The product was a white, slippery jelly grease-like polysilane, the polymer units of which were of the formula $(C_4H_9)_2Si=$.

Example 4

183.5 parts of $CH_3(C_{18}H_{37})SiCl_2$ was gradually added to 25 parts of molten metallic sodium in 519.6 parts of dry toluene. The reaction mixture was refluxed for 20 hours, at the end of which time the test for chlorides was negative. The reaction mixture was then filtered and washed. The product was next stripped of toluene. The resulting product was a wax-like polysilane, the polymer units of which were of the formula $CH_3C_{18}H_{37}Si=$.

That which is claimed is:

1. Polysilanes of from a grease-like to a wax-like consistency, the polymer units of which are of the structure $R_2Si=$ in which substantially all of the polymer units are linked by silicon to silicon bonding and in which R is alkyl and at least one R in each unit is an alkyl containing at least two carbon atoms.

2. A polysilane having a grease-like consistency, the polymer units of which are of the structure $CH_3C_3H_7Si=$ and in which substantially all of the polymer units are linked by silicon to silicon bonding.

3. A polysilane having a grease-like consistency, the polymer units of which are of the structure $(C_4H_9)_2Si=$ and in which substantially all of the polymer units are linked by silicon to silicon bonding.

4. A polysilane having a wax-like consistency, the polymer units of which are of the structure $CH_3C_{18}H_{37}Si=$ and in which substantially all of the polymer units are linked by silicon to silicon bonding.

5. A polysilane having a grease-like consistency, the polymer units of which are of the structure $(C_2H_5)_2Si=$ and in which substantially all of the polymer units are linked by silicon to silicon bonding.

HAROLD A. CLARK.

REFERENCES CITED

The following references are of record in the file of this patent:

UNITED STATES PATENTS

| Number | Name | Date |
|---|---|---|
| 2,483,972 | Goodwin | Oct. 4, 1949 |

OTHER REFERENCES

Kipping et al., Journ. Chem. Soc., London, vol. 119 pp. 830–847, 1921.

Palmer et al., Proc. Journ. Chem. Soc., London, 1930, pp. 1020 to 1028.

Burkhard, Journ. Amer. Chem. Soc. vol. 71, March 1949, pp. 963, 964.

Rochow, Chemistry of the Silicones, Wiley, 1946, pp. 45 and 46.